(12) United States Patent
Maurer et al.

(10) Patent No.: US 10,704,956 B2
(45) Date of Patent: Jul. 7, 2020

(54) PUSH-BROOM FOURIER TRANSFORM SPECTROMETER

(71) Applicant: Eagle Technology, LLC, Melbourne, FL (US)

(72) Inventors: Paul Maurer, Fort Wayne, IN (US); Ronald J. Glumb, Fort Wayne, IN (US); Peter Mantica, Fort Wayne, IN (US)

(73) Assignee: Eagle Technology, LLC, Melbourne, FL (US)

( * ) Notice: Subject to any disclaimer, the term of this patent is extended or adjusted under 35 U.S.C. 154(b) by 39 days.

(21) Appl. No.: 15/916,902

(22) Filed: Mar. 9, 2018

(65) Prior Publication Data

US 2019/0277700 A1 Sep. 12, 2019

(51) Int. Cl.
*G01J 3/453* (2006.01)
*G01J 3/02* (2006.01)
*G01J 3/28* (2006.01)
*G01J 5/00* (2006.01)

(52) U.S. Cl.
CPC ........... *G01J 3/4535* (2013.01); *G01J 3/0208* (2013.01); *G01J 3/2823* (2013.01); *G01J 2005/0077* (2013.01)

(58) Field of Classification Search
CPC ...... G01J 3/4535; G01J 3/2823; G01J 3/0208; G01J 2005/0077
See application file for complete search history.

(56) References Cited

U.S. PATENT DOCUMENTS

| 4,523,846 A | 6/1985 | Breckinridge et al. |
| 5,777,736 A | 7/1998 | Horton |
| 5,835,214 A * | 11/1998 | Cabib ............... G01J 3/12 356/452 |
| 7,135,682 B1 | 11/2006 | Lucey |
| 2010/0018289 A1* | 1/2010 | Oda ............... G01J 5/0014 73/25.05 |
| 2010/0056928 A1* | 3/2010 | Zuzak .............. A61B 5/0071 600/476 |
| 2010/0328659 A1* | 12/2010 | Bodkin ............ G01J 3/02 356/326 |

OTHER PUBLICATIONS

Chen, Y., et al., "CrIS Full Resolution Processing and Validation System for JPSS," Proc. 19th Int. TOVS Study Conf. (ITSC), pp. 1-12 (2014).
Hammer, P.D., et al., "Imaging Interferometry for Terrestrial Remote Sensing: Digital Array Scanned Interferometer Instrument Developments," Proc. SPIE 2480, Imaging Spectrometry, pp. 153-164 (Jun. 1995).

(Continued)

*Primary Examiner* — Hwa Andrew Lee
(74) *Attorney, Agent, or Firm* — Edell, Shapiro & Finnan, LLC

(57) ABSTRACT

Methods and systems to record amplitudes of an interference pattern of a source light at successive rows of a focal plane array as an interferometer traverses the source light, while varying an optical path difference of the interferometer. A fixed frame rate of the focal plane array may be selected such that each in-track row of the focal plane array provides a different point along the interferogram, for the same ground location.

20 Claims, 14 Drawing Sheets

(56) References Cited

OTHER PUBLICATIONS

Smith, W.H., and P.D. Hammer, "Digital Array Scanned Interferometer: Sensors and Results," Applied Optics, vol. 35 (16): 2902-2909 (Jun. 1996).
Newport (2018) Technical Note, Introduction to FTIR Spectroscopy, available at https://www.newport.com/n/introduction-to-ftir-spectroscopy.

* cited by examiner

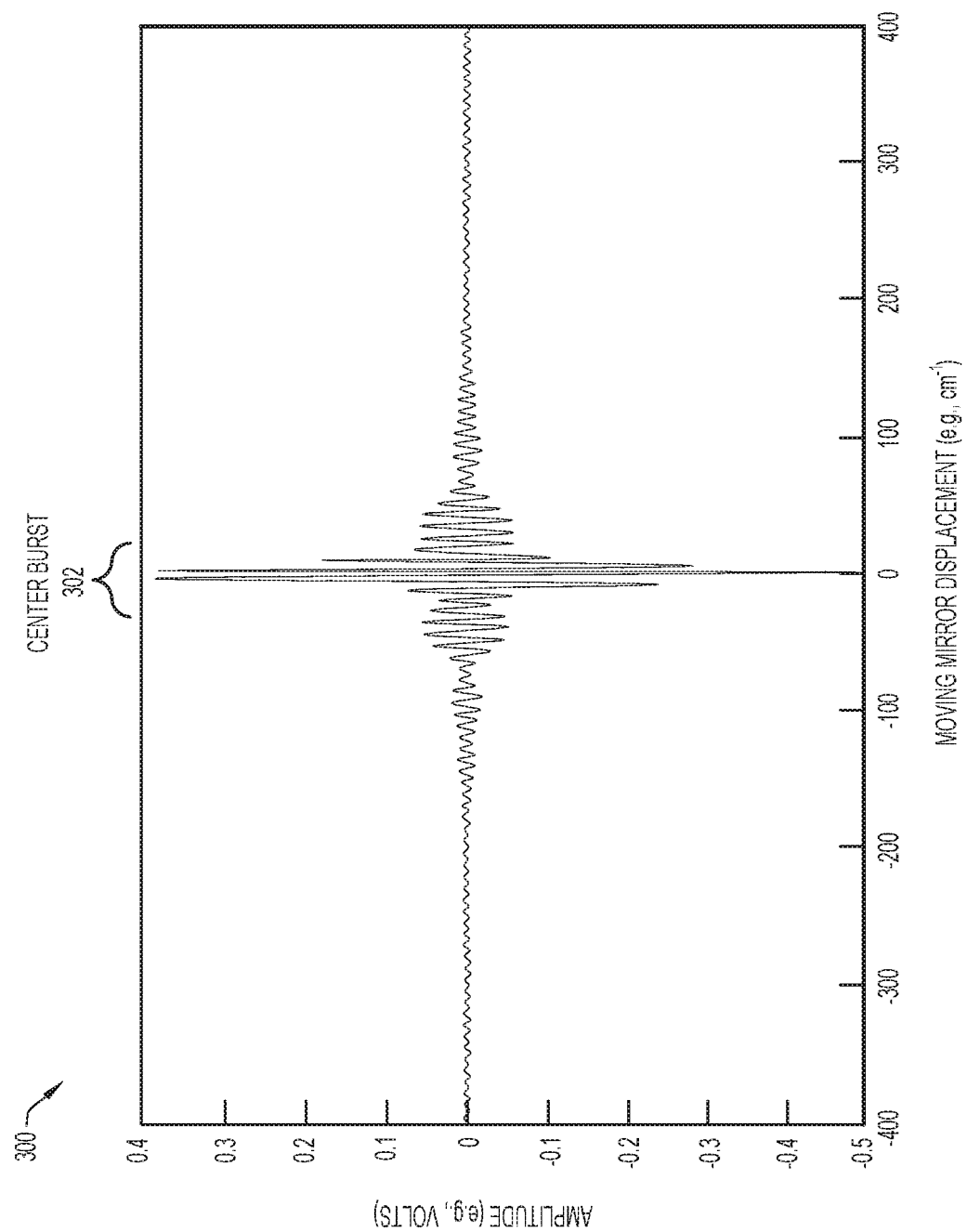

PUSH-BROOM FOURIER TRANSFORM SPECTROMETER

BACKGROUND

Imaging systems include scanner systems, staring systems (also known as step-staring systems), and time-delay integration (TDI) systems. Scanning systems include push broom scanners (also known as an along-track scanners), and whisk broom scanners (also known as across-track scanners). Scanning arrays are constructed from linear arrays (or very narrow 2-D arrays), that are rastered across a desired field of view using a rotating or oscillating mirror to construct a 2-D image over time. A TDI imager operates in similar fashion to a scanning array except that it images perpendicularly to the motion of the camera. A staring array is analogous to the film in a typical camera, in that it directly captures a 2-D image projected by a lens at an image plane. A scanning array is analogous to piecing together a 2D image with photos taken through a narrow slit. A TDI imager is analogous to looking through a vertical slit out the side window of a moving car, and building a long, continuous image as the car passes the landscape.

There is a demand for satellite-based hyperspectral imaging data collected over a wide area of the earth at fine spatial resolution. Fourier Transform Spectroscopy (FTS) instruments provide relatively high quality hyperspectral data. Conventional FTS system are operated as a step-stare systems, which require relatively fast focal plane array (FPA) frame rates to collect an interferogram while staring. This tends to the maximum size of the FPA, and thus requires fast step-staring to achieve a wide swath width. The resulting short stare time negatively impacts signal-to-noise ratio (SNR), and increases instrument complexity. As a result, FTS is normally not used for wide swath widths. Instead, dispersive systems are used, which provide inferior data quality, and tend to have higher cooling needs.

BRIEF DESCRIPTION OF THE DRAWINGS/FIGURES

FIG. 3 is a depiction of an example interferogram.

Figure 9:
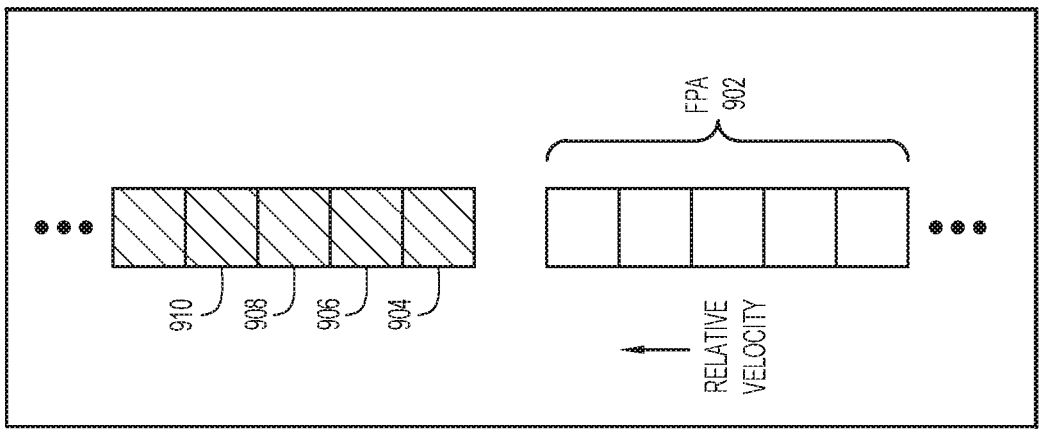
FIG. 9 is a conceptual illustration of another FPA to record amplitudes of interference patterns generated from multiple source lights as an interferometer traverses the respective source lights, and as the OPD of the interferometer is varied.
Figure 13:
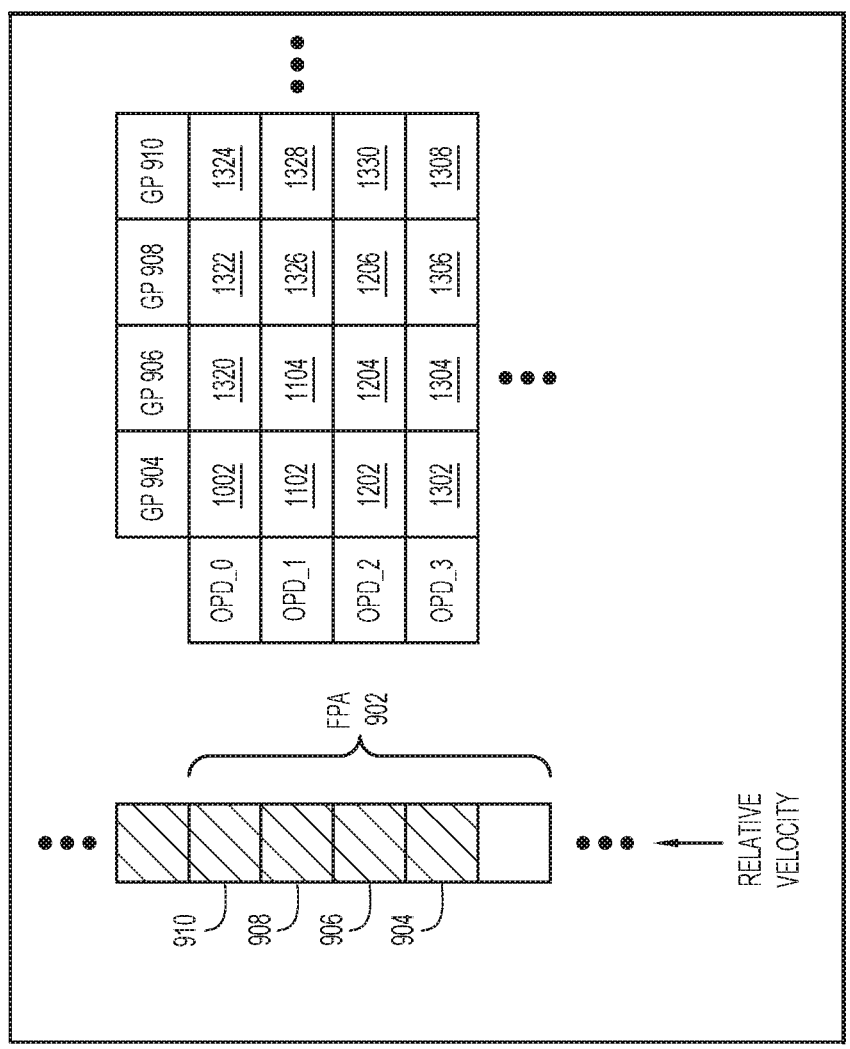

FIG. 13 is a conceptual illustration of the FPA of FIG. 9 as a fourth pixel records an amplitude of the interference pattern of the first grid point, the third pixel records an amplitude of the interference pattern of the second grid point, the second pixel records an amplitude of the interference pattern of the third grid point, and the first pixel records an amplitude of the interference pattern of a fourth grid point, at an OPD setting.

Figure 14:
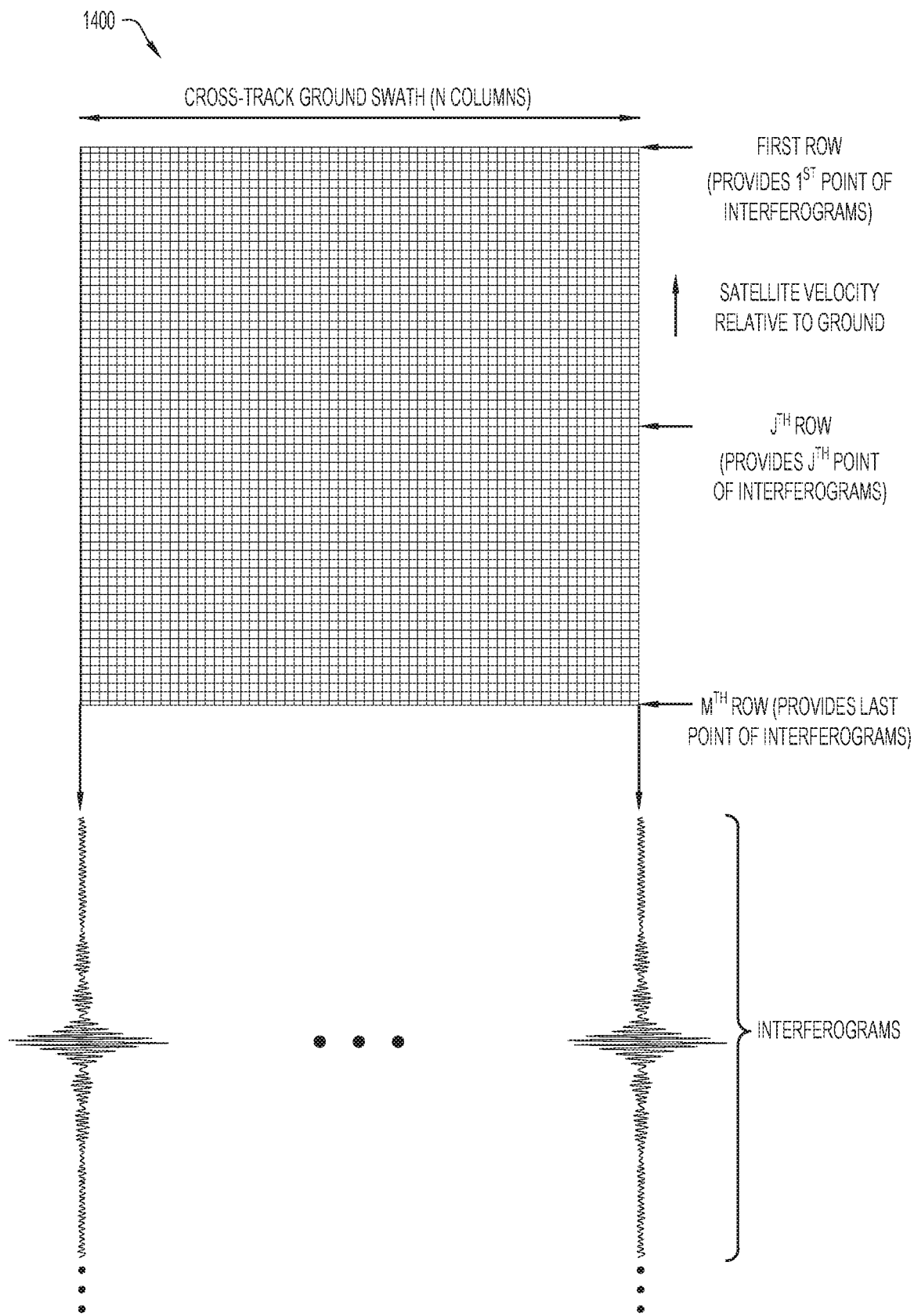

FIG. 14 is a diagram of a 2-dimensional FPA.

Figure 15:
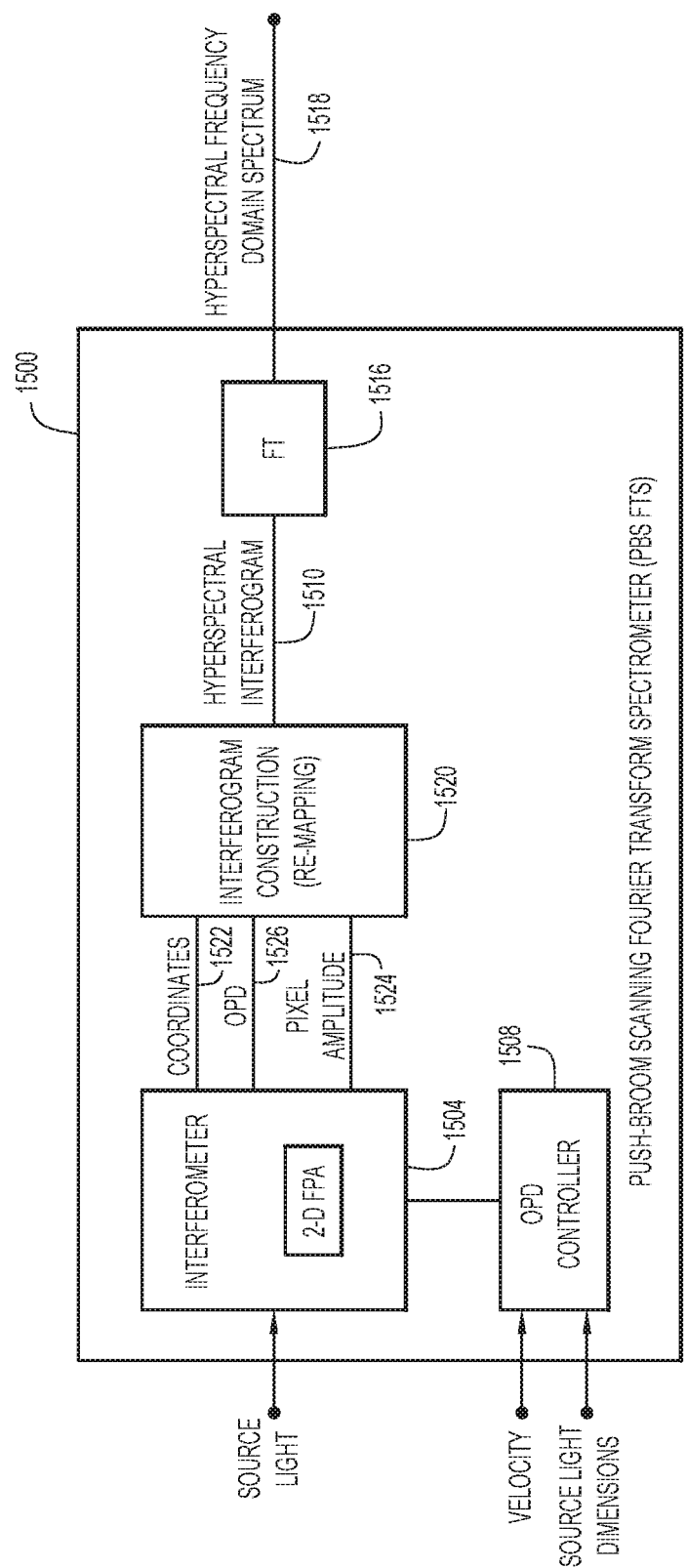

FIG. 15. is a block diagram of another push-broom scanning Fourier transform spectrometer.

Figure 16:
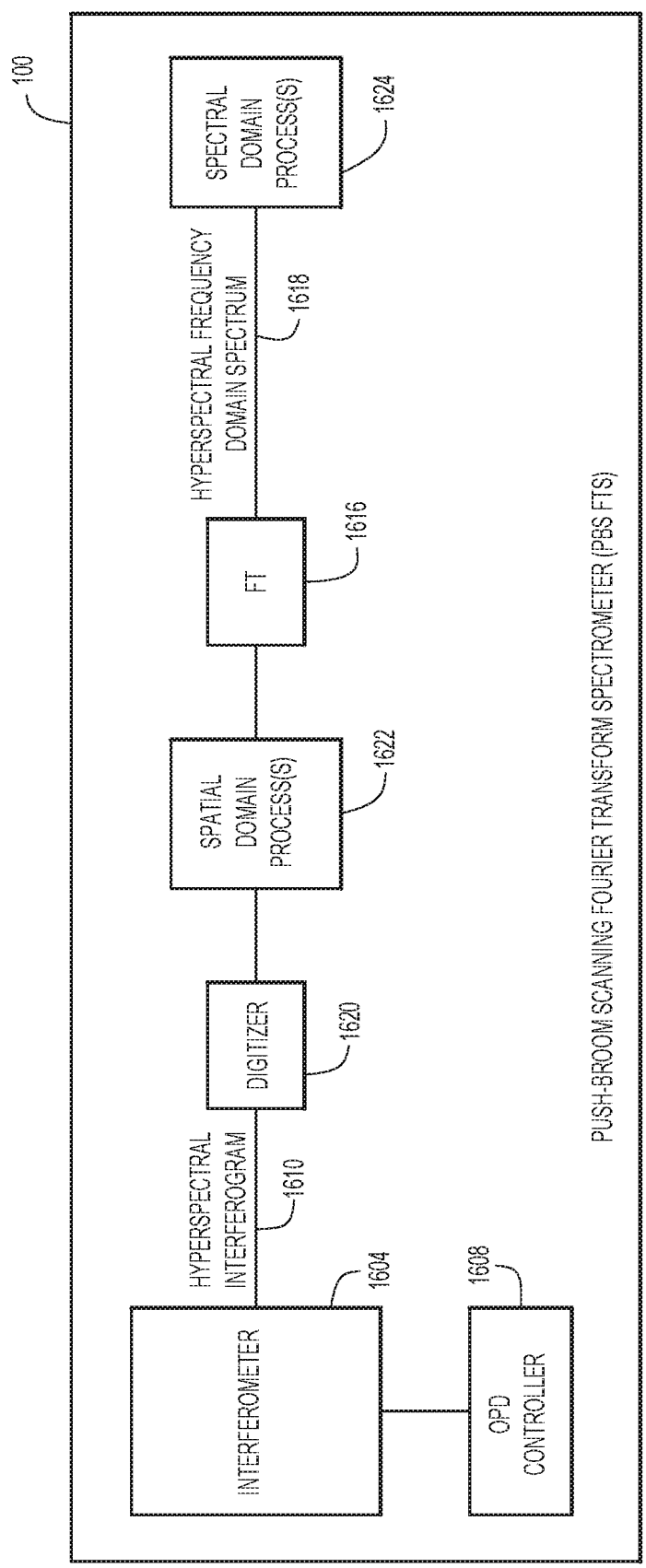

FIG. 16 is a block diagram of another push-broom scanning Fourier transform spectrometer.

Figure 17:
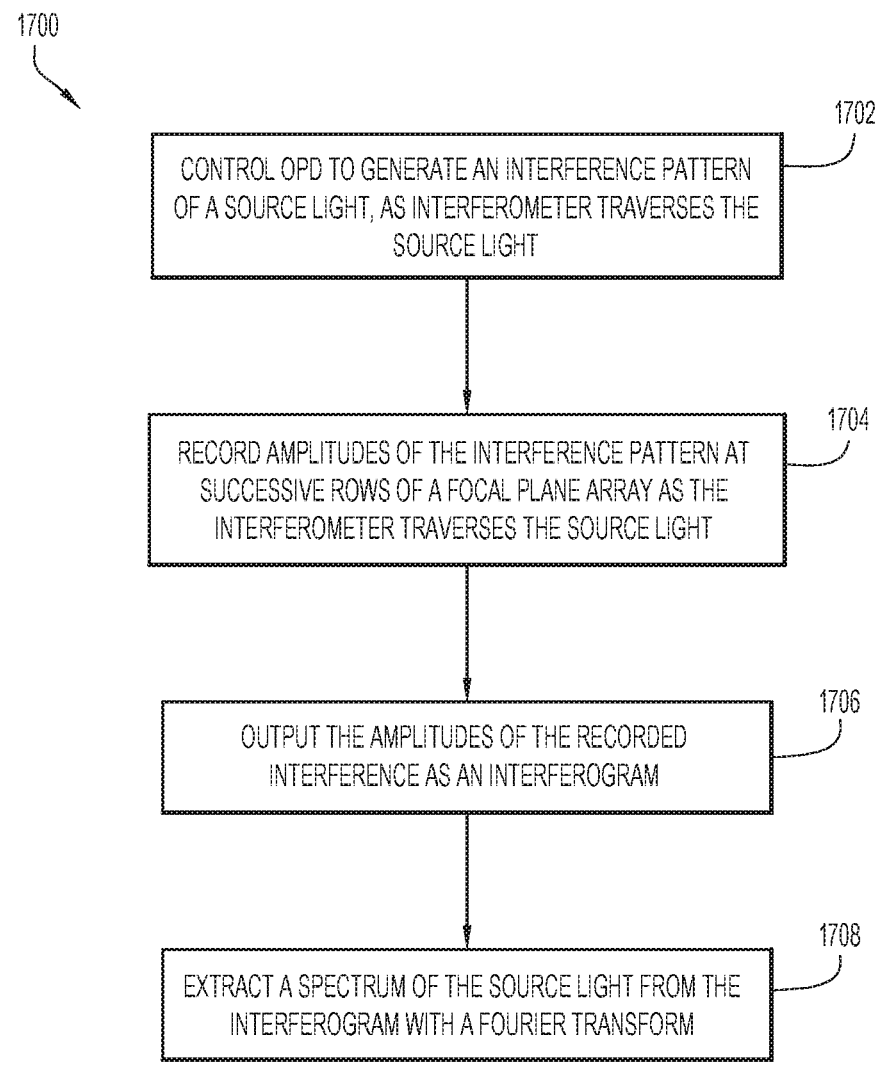

FIG. 17 is a flowchart of a method of extracting a spectrum of a source light with a push-broom scanning Fourier transform technique.

Figure 18:
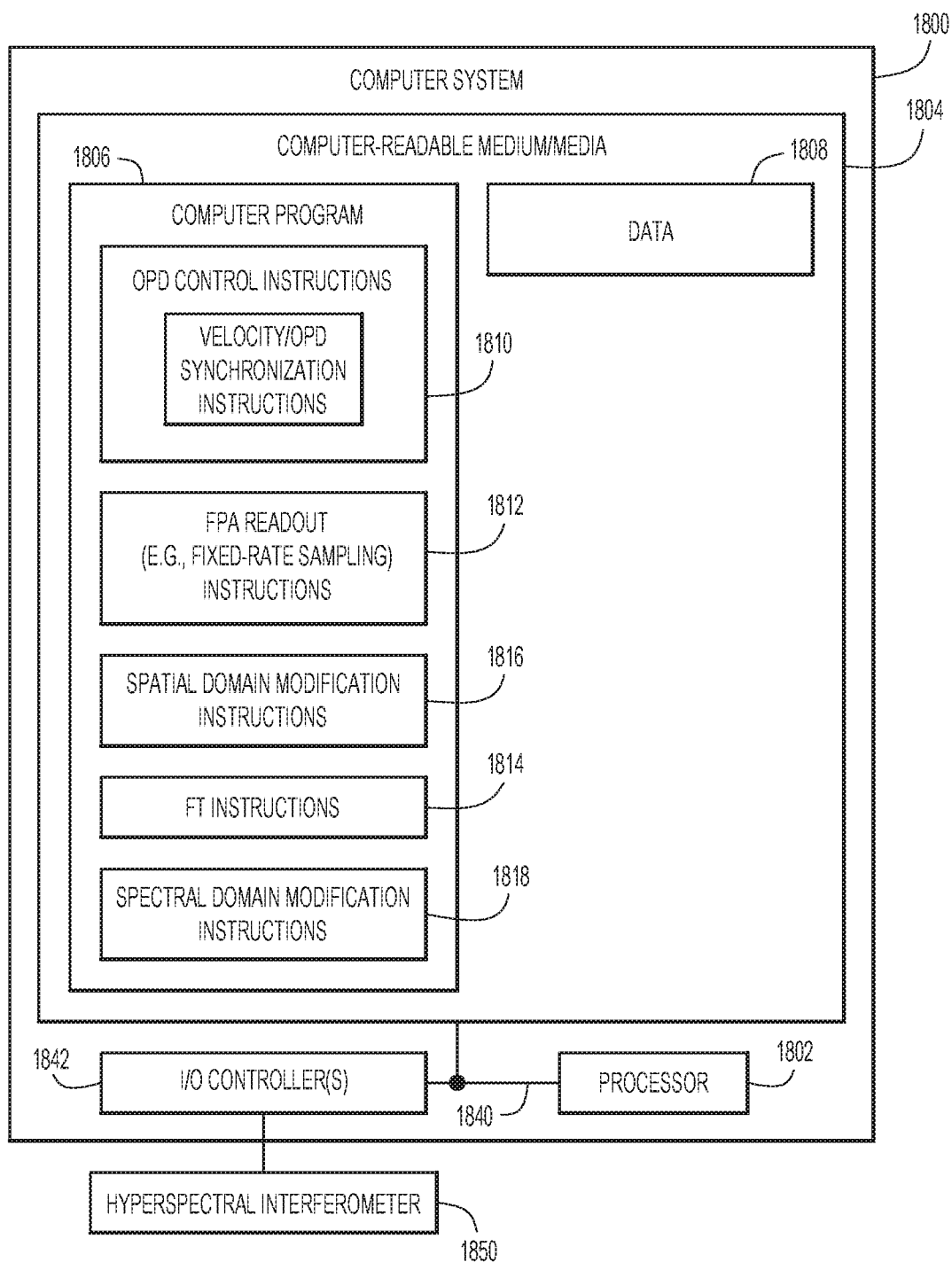

FIG. 18 is a block diagram of a computer system configured to extract a spectrum of a source light with a push-broom scanning Fourier transform technique.

In the drawings, the leftmost digit(s) of a reference number identifies the drawing in which the reference number first appears.

DETAILED DESCRIPTION

Disclosed herein are techniques referred to as push-broom Fourier transform spectroscopy.

A satellite-based push-broom Fourier Transform Spectrometer (FTS) effectively stares at nadir (e.g., vertically downward from a satellite toward a terrestrial surface), such that motion of the satellite causes a point on the ground to drift across a FPA of the push-broom FTS, in an in-track direction. As the point drifts across the FPA, an optical path difference (OPD) of the push-broom FTS is varied over a range of OPD (e.g., by sweeping a mirror of the push-broom FTS), to generate an interferogram. A frame rate of the FPA is selected such that each in-track row of the FPA provides a different point along the interferogram, for the same ground location. Once the full FPA has drifted across a given ground point, the FPA has effectively produced a complete interferogram at each cross-track location in the FPA. The interferometer then reverses and begins a new OPD sweep in the opposite direction. Slight overlap in the FPA in-track direction prevents data gaps during reversals.

Figure 1:
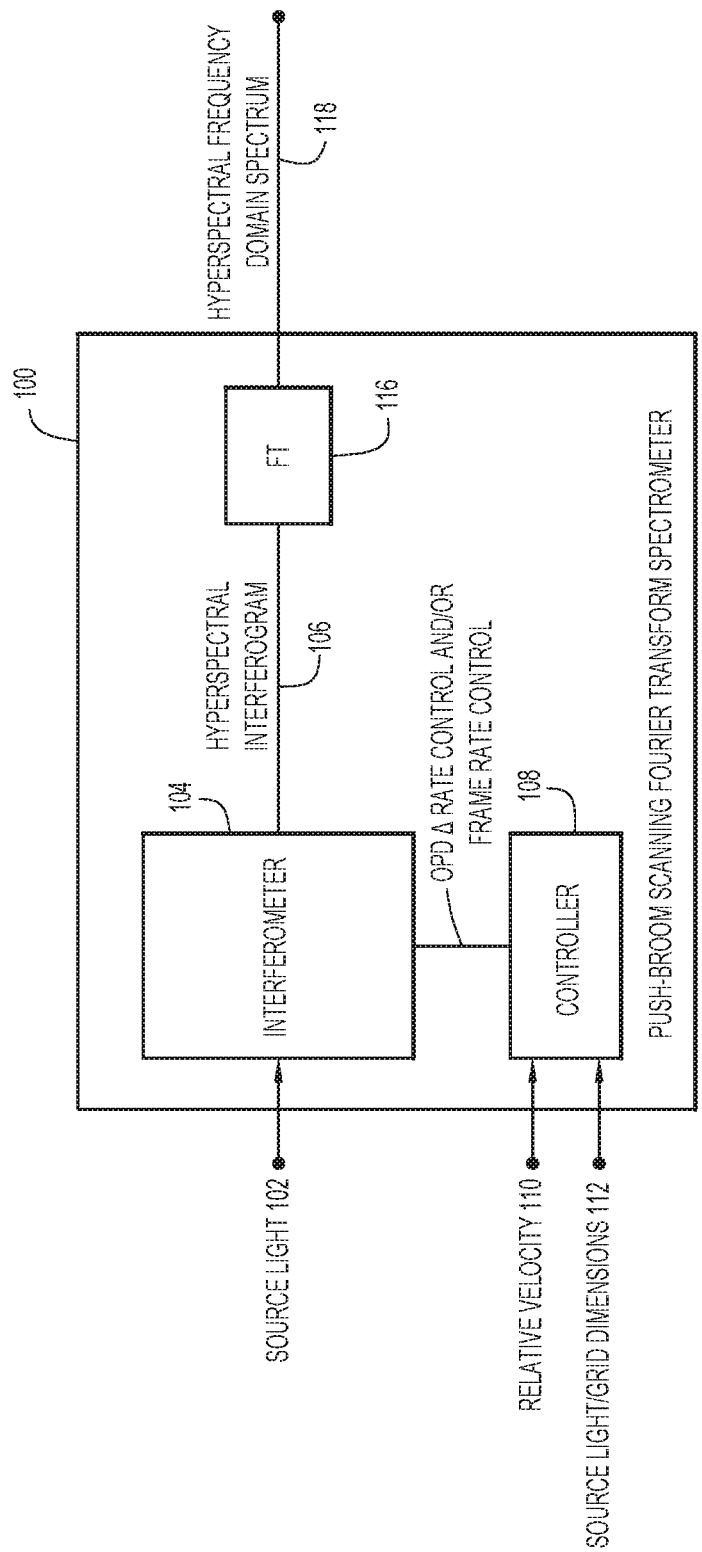
FIG. 1 is a block diagram of a push-broom scanning Fourier transform spectrometer.

FIG. 1 is a block diagram of a push-broom scanning Fourier Transform Spectrometer (spectrometer) 100, to determine a spectrum of a source light 102. Source light 102 may represent, for example and without limitation, light reflected from a portion of the Earth as viewed from a satellite.

Spectrometer 100 includes an interferometer 104, which includes a detector 105 to provide a hyperspectral interferogram 106 of source light 102. Spectrometer 100 further includes a Fourier transform module or engine 116 to convert hyperspectral interferogram 106 to a frequency domain spectrum (spectrum) 118. Fourier transform engine 116 may be configured to perform a fast Fourier transform (FFT) on a power of 2 samples.

Spectrometer 100 further includes a controller 108 to control an optical path difference (OPD) of interferometer 104. Controller 108 may be configured to control the OPD of interferometer 104 based on a relative velocity 110 of spectrometer 100 and/or based on a dimension 112 of source light 102, so as to sweep a predetermined range of OPD. Controller 108 may also be configured to control FPA frame rate of interferometer 104 based on a relative velocity 110 of spectrometer 100 and/or based on a dimension 112 of source light 102.

Spectrometer 100 and/or portions thereof, may be configured as described in one or more examples below. Spectrometer 100 is not, however, limited to the examples below.

Figure 2:
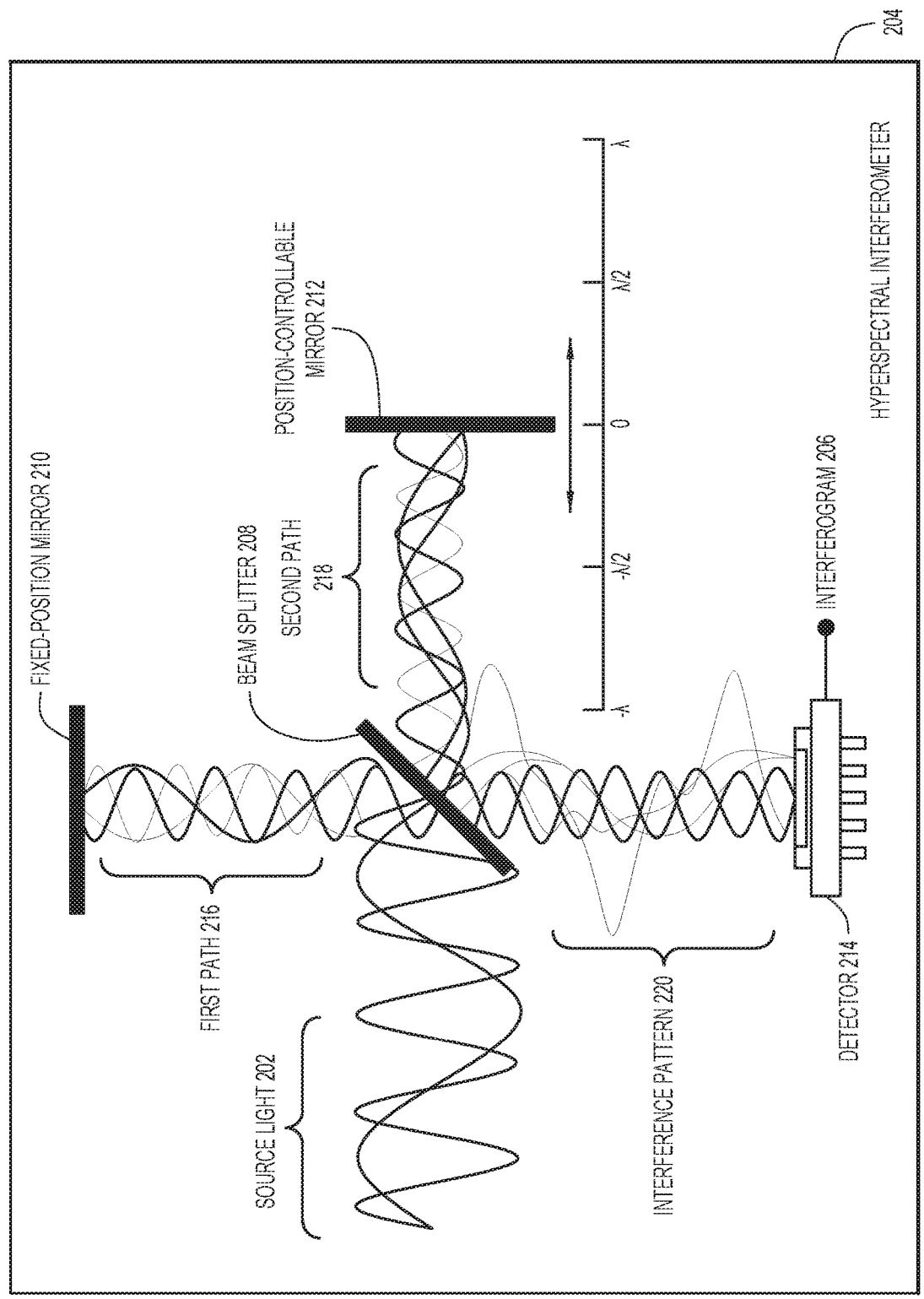
FIG. 2 is a diagram of an interferometer.

FIG. 2 is a diagram of an interferometer 204 that includes a beam splitter 208 to split a source light 202 into first and second portions. The first portion is reflected from beam splitter 208 to a fixed-position mirror 210 along a first path 216. The second portion is transmitted through beam splitter 208 to a position-controllable mirror 212 along a second path 218. Mirrors 210 and 212 reflect the respective portions of light back to beam splitter 208, which re-directs the portions (or fractions thereof), as an interference pattern 220, to a detector 214. Detector 214 may include an array (linear or 2-dimensional array), of light-sensing pixels at the focal plane of a lens. Detector 214 is also referred to herein as a focal plane array (FPA).

Interferometer 204 may include one or more additional optical elements (e.g., a lens) between beam splitter 208 and one or more of source light 202, mirror 210, mirror 212, and detector 214. Mirror 116 and/or mirror 118 may include a flat mirror and/or a corner cube reflector.

Detector 214 is configured to record amplitudes of interference pattern 220, to provide an interferogram 206.

Where source light 202 includes multiple wavelengths of light, interferogram 206 will be more complex than a single sinusoid, such as described below with reference to FIG. 3.

FIG. 3 is a depiction of an example interferogram 300. The horizontal or X-axis of interferogram 300 represents an optical path difference (OPD).

OPD is a measure of an optical path difference between light beams travelling through two arms of an interferometer (e.g., a difference between first and second paths 216 and 218 in FIG. 2). In FIG. 2, OPD is a function of a product of the physical distance travelled by mirror 212, a multiplier that is a function of a number of reflecting elements, and an index of refraction of a medium of the interferometer arms (e.g., air, nitrogen for purged systems, etc.).

Interferometer 204 has a natural reference point when mirrors 210 and 212 are the same distance from beam splitter 208. This condition is called zero path difference (ZPD). The moving mirror displacement, $\Delta$, is measured from the ZPD. In FIG. 2, light reflected from mirror 212 travels $2\Delta$ further than light reflected from fixed-position mirror 210. The relationship between optical path difference, and mirror displacement, $\Delta$, is OPD=$2\Delta n$.

In FIG. 3, units of spectral measurement (OPD), are defined as a wavenumber ($cm^{-1}$). A wavenumber represents the number of full waves of a particular wavelength per centimeter (cm) of length of travel of a mirror of an interferometer (typically in vacuum; index of refraction n=1). An advantage of defining the spectrum in wavenumbers is that the wavenumber are directly related to energy levels. For example, a spectral feature at 4,000 cm-1 spectral location represents a transition between two molecular levels separated by twice the energy of a transition with spectral signature at 2,000 $cm^{-1}$.

Interferogram 300 includes a spike or center burst 302 at 0 $cm^{-1}$, which is a signature of a broadband source light. Center burst 302 indicates that all or substantially all wavelengths of a source light are in-phase at ZPD, such that contributions from each wavelength is at maximum. As the optical path difference, OPD, grows (i.e., as mirror 212 in FIG. 2 moves away from ZPD, toward $\lambda$ or $-\lambda$), different wavelengths of the source light produce peak readings at different positions of the movable mirror (e.g., mirror 212 in FIG. 2). For a broadband source light, the different wavelengths reach their respective peaks at ZPD and, as the movable mirror moves away from ZPD, interferogram 300 becomes a relatively complex-looking oscillatory signal with decreasing amplitude.

Each individual spectral component of the source light contributes a sinusoid to interferogram 300, with a frequency that is inversely proportional to the wavelength of the respective spectral component.

Figure 4:
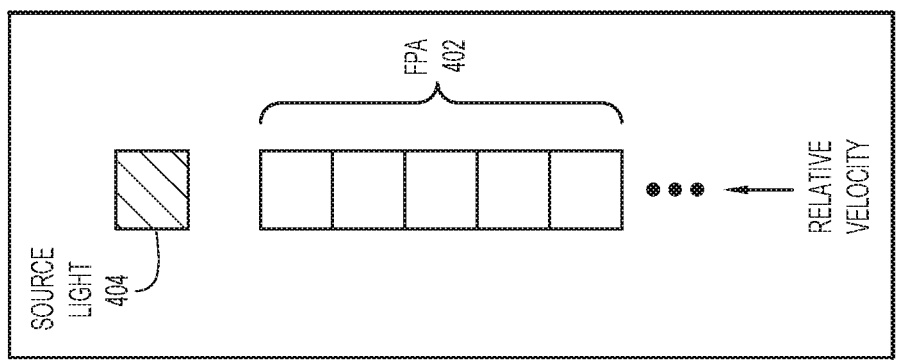
FIG. 4 is a conceptual illustration of a focal plane array (FPA) of an interferometer to record amplitudes of an interference pattern generated from a source light, as the interferometer traverses source light, and as an optical path difference (OPD) of the interferometer is varied.

FIG. 4 is a conceptual illustration of a focal plane array (FPA) 402 of an interferometer to capture or record amplitudes of an interference pattern generated from a source light 404, as the interferometer traverses (e.g., as FPA 402 passes or drifts over) source light 404, and as the OPD of the interferometer is varied. The interferometer may, for example, reside on a satellite that orbits a terrestrial body, and source light 404 may represent an area of a surface of the terrestrial body.

Figure 5:
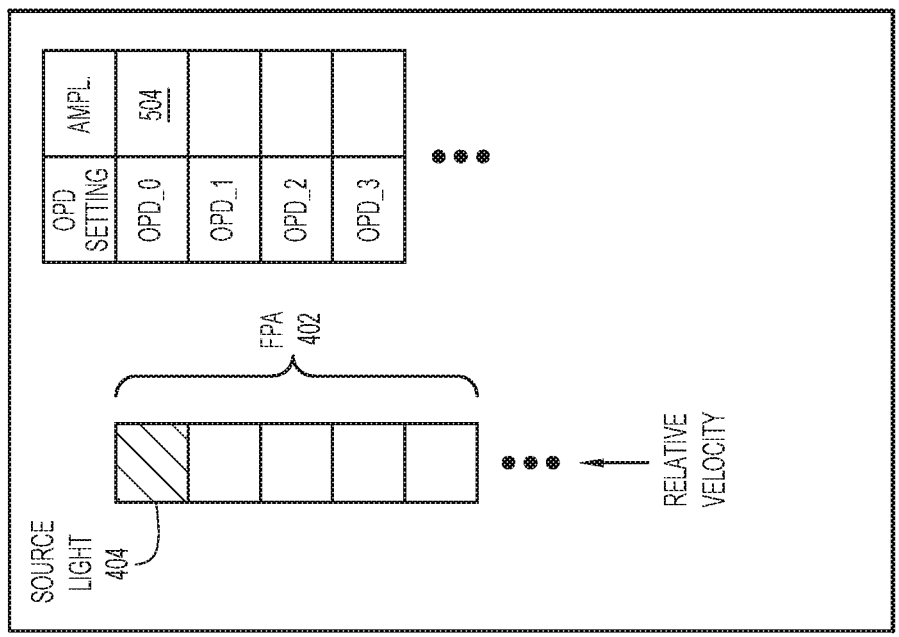
FIG. 5 is a conceptual illustration of the FPA as a first pixel records an amplitude of the interference pattern at a first OPD setting.

FIG. 5 is a conceptual illustration of FPA 402 as a first pixel of FPA 402 records an amplitude 504 of the interference pattern, at a first OPD setting OPD_0.

Figure 6:
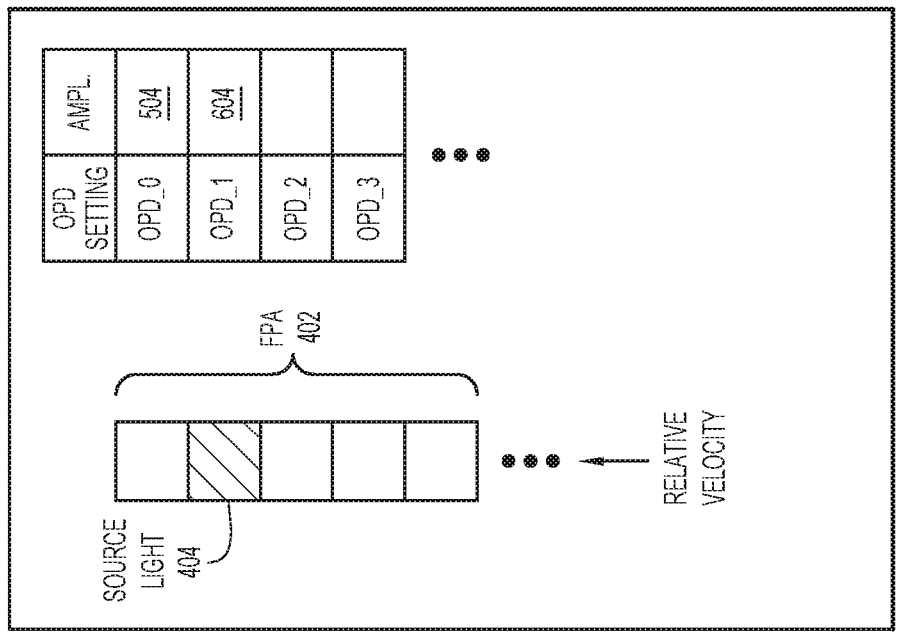
FIG. 6 is a conceptual illustration of the FPA as a second pixel records an amplitude of the interference pattern at a second OPD setting.

FIG. 6 is a conceptual illustration of FPA 402 as a second pixel of FPA 402 records an amplitude 604 of the interference pattern, at a second OPD setting OPD_1.

Figure 7:
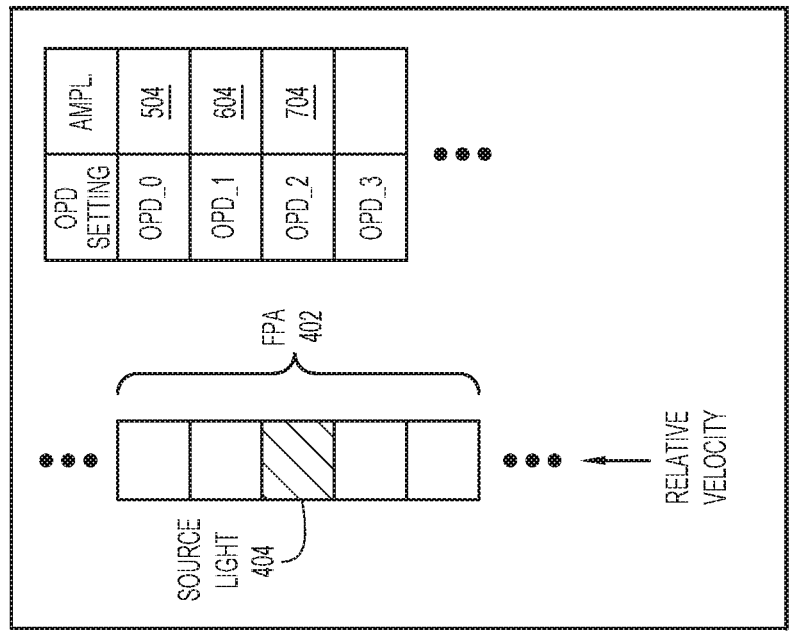
FIG. 7 is a conceptual illustration of the FPA as a third pixel records an amplitude of the interference pattern at a third OPD setting.

FIG. 7 is a conceptual illustration of FPA 402 as a third pixel of FPA 402 records an amplitude 704 of the interference pattern, at a third OPD setting OPD_2.

Figure 8:
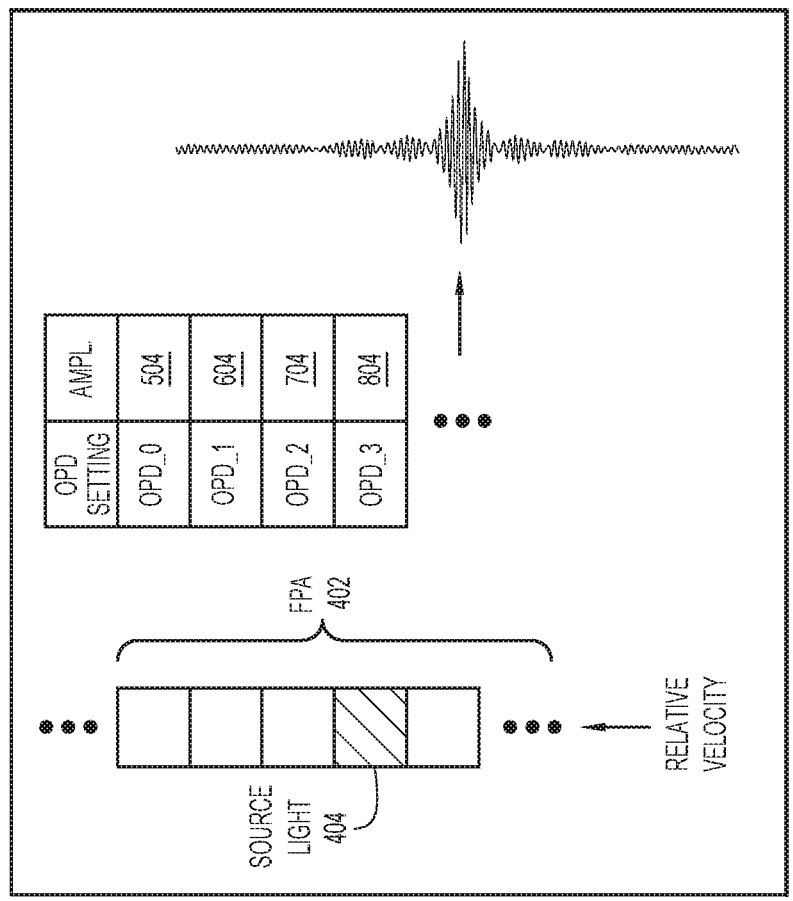
FIG. 8 is a conceptual illustration of the FPA as a fourth pixel records an amplitude of the interference pattern at a fourth OPD setting.

FIG. 8 is a conceptual illustration of FPA 402 as a fourth pixel of FPA 402 records an amplitude 804 of the interference pattern, at a fourth OPD setting OPD_3. FIG. 8 further illustrates an interferogram 806 generated or constructed from the recorded amplitudes 504, 604, 704, and 804 of the interference pattern.

The technique illustrated in FIGS. 4-8 may be extended to generate interferograms of multiple source lights, as an interferometer traverses the respective source lights, and as the OPD of the interferometer is varied, such as described below with reference to FIGS. 9-13.

FIG. 9 is a conceptual illustration of a focal plane array (FPA) 902 of an interferometer to capture or record amplitudes of interference patterns generated from multiple source lights, as the interferometer traverses the respective source lights, and as the OPD of the interferometer is varied. In the example of FIG. 9, the source lights are illustrated as including grid positions 904, 906, 908, and 910, which may correspond to respective portions or areas of a terrestrial surface.

Figure 10:
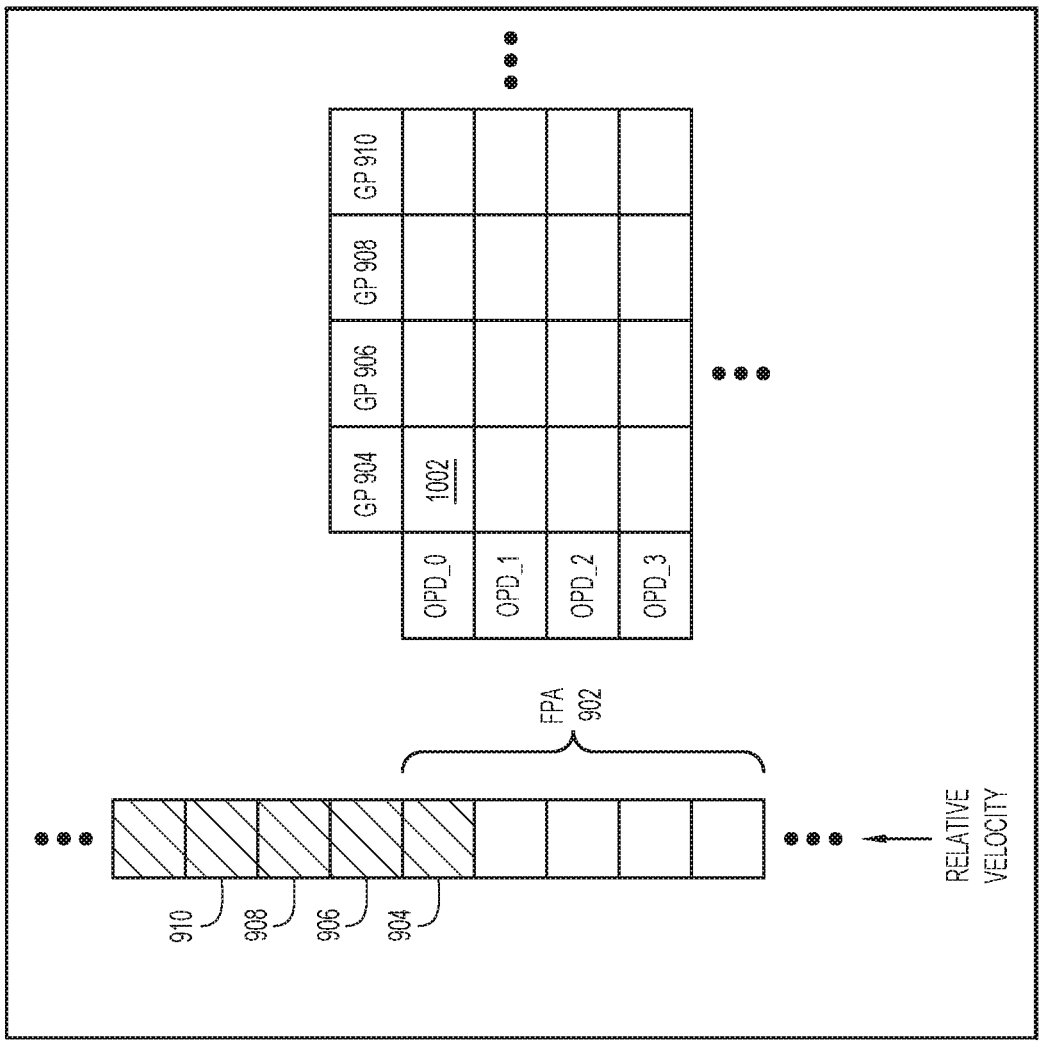
FIG. 10 is a conceptual illustration of the FPA of FIG. 9 as a first pixel records an amplitude of the interference pattern of a first grid point, at a first OPD setting.

FIG. 10 is a conceptual illustration of FPA 902 as a first pixel of FPA 902 records an amplitude 1002 of the interference pattern of grid point 904, at a first OPD setting OPD_0.

Figure 11:
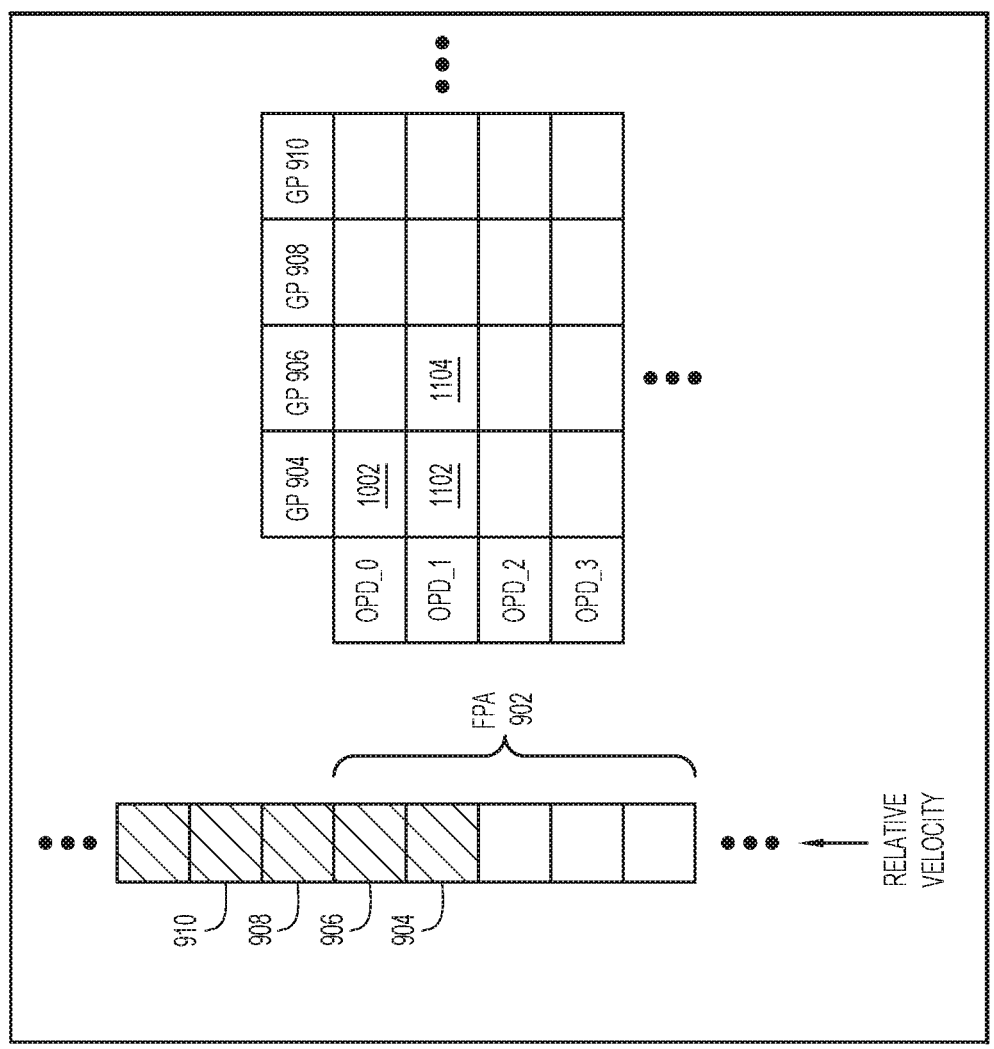
FIG. 11 is a conceptual illustration of the FPA of FIG. 9 as a second pixel records an amplitude of the interference pattern of the first grid point, and as the first pixel records an amplitude of an interference pattern of a second grid point, at a second OPD setting.

FIG. 11 is a conceptual illustration of FPA 902 as a second pixel of FPA 902 records an amplitude 1002 of the interference pattern of grid point 904, and as the first pixel of FPA 902 records an amplitude 1004 of the interference pattern of grid point 906, at a second OPD setting OPD_1.

Figure 12:
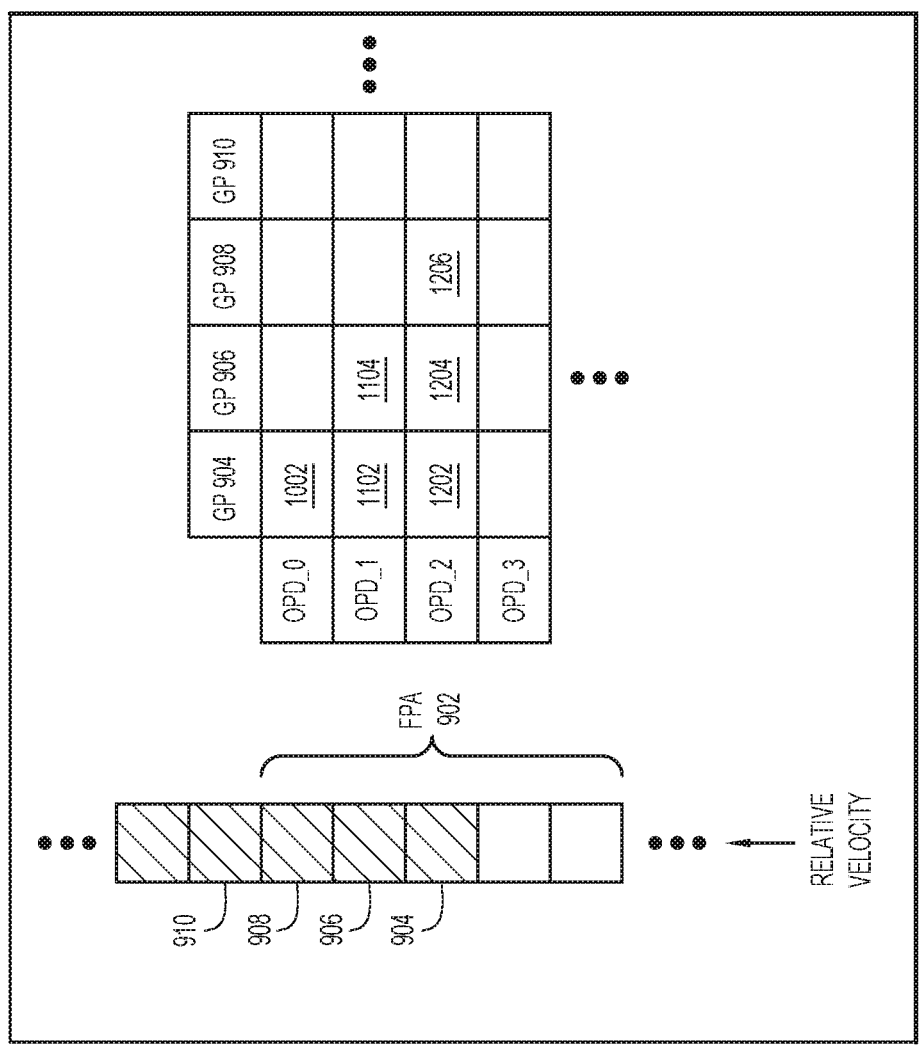
FIG. 12 is a conceptual illustration of the FPA of FIG. 9 as a third pixel records an amplitude of the interference pattern of the grid point, the second pixel records an amplitude of the interference pattern of the second grid point, and the first pixel records an amplitude of the interference pattern of a third grid point, at a third OPD setting.

FIG. 12 is a conceptual illustration of FPA 902 as a third pixel of FPA 902 records an amplitude 1202 of the interference pattern of grid point 904, the second pixel of FPA 902 records an amplitude 1204 of the interference pattern of grid point 906, and the first pixel of FPA 902 records an amplitude 1206 of the interference pattern of grid point 908, at a third OPD setting OPD_2.

FIG. 13 is a conceptual illustration of FPA 902 as a fourth pixel of FPA 902 records an amplitude 1302 of the interference pattern of grid point 904, the third pixel of FPA 902 records an amplitude 1304 of the interference pattern of grid point 906, the second pixel of FPA 902 records an amplitude 1306 of the interference pattern of grid point 908, and the first pixel of FPA 902 records an amplitude 1308 of the interference pattern of grid point 910, at an OPD setting OPD_3.

Additional amplitudes may be recorded for subsequent positions of FPA 902 and corresponding OPDs, until there are sufficient data points to provide an interferogram for the respective grid points. This may include reversing a direction of movement, or re-setting a position of an OPD control mechanism, such as mirror 212 in FIG. 2. This may facilitate collection of amplitude data 1320 through 1330 in FIG. 13.

Techniques disclosed herein may be further extended to a 2-dimensional FPA, such as to map a relatively broad swath of a terrestrial surface, such as described below with reference to FIG. 14.

FIG. 14 is a diagram of a 2-dimensional FPA 1400 that includes n columns of m rows of detectors or pixels. Each of them columns is configured to record amplitudes of interference patterns as an interferometer traverses a light source (e.g., a terrestrial surface), to provide a stream of interferograms for a corresponding sequence of grid areas or points, such as described above with reference to FIGS. 9-13.

FIG. 15. is a block diagram of a push-broom scanning Fourier transform spectrometer (spectrometer) 1500. Spectrometer 1500 includes an interferometer 1504, an OPD controller 1508, and a Fourier transform (FT) engine 1516, such as described above with reference to FIG. 1.

Spectrometer 1500 further includes an interferogram constructor 1520 to construct an interferogram 1510 for each of multiple grid coordinates 1522 of a source light (e.g., for each of multiple grid areas or points of a terrestrial surface). For each grid coordinate 1522, interferogram constructor 1520 is configured to receive/collect pixel amplitudes 1524 for a range of OPD values 1526, and arrange the pixel amplitudes into interferograms 1510. This may be useful in situations where pixel amplitudes that are collected out of order (e.g., amplitudes 1320-1330 in FIG. 13).

A push-broom scanning Fourier transform spectrometer, as disclosed herein, may be configured to modify an interferogram in a spatial domain and/or to modify a spectrum of the interferogram in a spectral domain, such as described below with respect to FIG. 16.

FIG. 16 is a block diagram of a push-broom scanning Fourier transform spectrometer (spectrometer) 1600. Spectrometer 1600 includes an interferometer 1604, an OPD controller 1608, and a Fourier transform (FT) engine 1516, such as described above with reference to FIG. 1.

Spectrometer 1600 further includes a digitizer 1620 to digitize an interferogram 1610. Digitizer 1620 may be configured to sample interferogram 1610 at a fixed rate.

Spectrometer 1600 further includes a spatial domain process engine 1622 to modify the digitized interferogram in a spatial domain. Modifications may include, without limitation, re-sampling and/or compensation.

Spectrometer 1600 further includes a spectral domain process engine 1624 to modify a spectrum 1618 in a spectral domain. Modifications may include, without limitation, non-linearity adjustments, radiometric calibration, spectral adjustment, and/or compression (e.g., for storage and/or transmission).

One or more features disclosed herein may be implemented in, without limitation, circuitry, a machine, a computer system, a processor and memory, a computer program encoded within a computer-readable medium, and/or combinations thereof. Circuitry may include discrete and/or integrated circuitry, application specific integrated circuitry (ASIC), field programmable gate array (FPGA), a system-on-a-chip (SOC), and combinations thereof.

FIG. 17 is a flowchart of a method 1700 of extracting a spectrum of a source light with a push-broom scanning Fourier transform technique. Method 1700 is described below with reference to one or more preceding examples. Method 1700 is not, however, limited to any of the preceding examples.

At 1702, an OPD of an interferometer is controlled to generate an interference pattern of a light source as the interferometer traverses the light source, such as described in one or more examples above.

At 1704, amplitudes of the interference pattern are recorded at successive rows of a focal plane array as the interferometer traverses the light source, and as the OPD is varied, such as described in one or more examples above.

At 1706, an interferogram is generated from the recorded amplitudes, such as described in one or more examples above.

At 1708, a spectrum of the source light is extracted from the interferogram, such as described in one or more examples above.

FIG. 18 is a block diagram of a computer system 1800, configured to extract a spectrum of a source light with a push-broom scanning Fourier transform technique.

Computer system 1800 includes one or more processors, illustrated here as a processor 1802, to execute instructions of a computer program 1806 encoded within a computer-readable medium 1804. Medium 1804 may include a transitory or non-transitory computer-readable medium.

Computer-readable medium 1804 further includes data 1808, which may be used by processor 1802 during execution of computer program 1806, and/or generated by processor 1802 during execution of computer program 1806.

Processor 1802 may include one or more instruction processors and/or processor cores, and a control unit to interface between the instruction processor(s)/core(s) and computer readable medium 1804. Processor 1802 may include, without limitation, a microprocessor, a graphics processor, a physics processor, a digital signal processor, a network processor, a front-end communications processor, a co-processor, a management engine (ME), a controller or microcontroller, a central processing unit (CPU), a general purpose instruction processor, and/or an application-specific processor.

In the example of FIG. 18, computer program 1806 includes OPD instructions 1810 to cause processor 1802 to vary an OPD of an interferometer 1850 as interferometer 1850 traverses a source light, such as described in one or more examples above. OPD instructions 1810 may include instructions to cause processor 1802 to synchronize a rate of change of the OPD with a relative velocity of interferometer 1850, such as described in one or more examples above.

Computer program 1806 further includes FPA readout instructions 1812 to cause processor 1802 to read (e.g., sample), amplitudes of interferogram recorded by an FPA of interferometer 1850. FPA readout instructions 1812 may include instruction to processor 1802 to output or sample the amplitudes at a fixed rate.

Computer program 1806 further includes Fourier transform (FT) instructions 1814 to cause processor 1802 to extract spectrums from interferograms, such as described in one or more examples above.

Computer program 1806 may further include spatial domain modification instructions 1816 to cause processor 1802 to modify interferograms in a spatial domain, such as described in one or more examples above.

Computer program 1806 may further include spectral domain modification instructions 1818 to cause processor 1802 to modify extracted spectra in a spectral domain, such as described in one or more examples above.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

What is claimed is:

1. An apparatus comprising:
   an interferometer, including a focal plane array, to stare downwards at a surface comprising a source light,
      wherein the focal plane array records amplitudes of an interference pattern of the source light at successive rows of the focal plane array as the interferometer traverses the source light, and
      wherein the focal plane array has a fixed frame rate selected such that each in-track row of the focal plane array corresponds to a different point along an interferogram for the source light; and
   an optical path difference controller, coupled to the interferometer, configured to vary an optical path difference of the interferometer as the interferometer traverses the source light.

2. The apparatus of claim 1, wherein:
   the optical path difference controller is configured to vary the optical path difference based on a relative velocity of the interferometer to the source light.

3. The apparatus of claim 1, wherein:
   the optical path difference controller is configured to synchronize a rate of change of the optical path difference with a relative velocity of the interferometer to vary the optical path difference over a predetermined range as the interferometer traverses the source light.

4. The apparatus of claim 1, wherein:
   one or more processors coupled to the interferometer to output the recorded amplitudes on the focal plane array at a fixed rate.

5. The apparatus of claim 4, further including:
   a spatial domain process engine to re-sample the interferogram associated with amplitudes of respective portions of the interferogram; and
   a Fourier transform engine to extract a spectrum of the source light from the resampled interferogram.

6. The apparatus of claim 1, wherein:
   the focal plane array records amplitudes of interference patterns of multiple adjacent source lights at successive rows of respective columns of the focal plane array as the interferometer traverses the source lights and as the optical path difference of the interferometer is varied by the optical path difference controller, and outputs amplitudes of the columns of the focal plane array as interferograms of the respective source lights.

7. The apparatus of claim 6, wherein the adjacent source lights correspond to a swath of a terrestrial surface.

8. A method, comprising:
   recording amplitudes, by a focal plane array, of an interference pattern of a source light at successive rows of the focal plane array as an interferometer, positioned to stare downwards at a surface comprising the source light, traverses the source light, wherein the focal plane array has a fixed frame rate selected such that each in-track row of the focal plane array corresponds to a different point along the interferogram for the source light; and
   varying an optical path difference of the interferometer, by an optical path difference controller coupled to the interferometer, as the interferometer traverses the source light.

9. The method of claim 8, wherein the varying includes:
   varying the optical path difference with a relative velocity of the interferometer the source light.

10. The method of claim 8, wherein the varying includes:
    synchronizing a rate of change of the optical path difference with a relative velocity of the interferometer to vary the optical path difference over a predetermined range as the interferometer traverses the source light.

11. The method of claim 8, further including:
    output the recorded amplitudes by the one or more processors from the focal plane array at a fixed rate.

12. The method of claim 11, further including:
    re-sampling the interferogram associated with amplitudes of respective portions of the interferogram; and
    extracting a spectrum of the source light from the resampled interferogram with a Fourier transform.

13. The method of claim 8, wherein the recording includes:
    recording amplitudes of interference patterns of multiple adjacent source lights at successive rows of respective columns of the focal plane array as the interferometer traverses the source lights and as the optical path difference of the interferometer is varied by the optical path difference controller, and outputting amplitudes of the columns of the focal plane array as interferograms of the respective source lights.

14. The method of claim 13, wherein the adjacent source lights correspond to a swath of a terrestrial surface.

15. A non-transitory computer readable medium encoded with a computer program that includes instructions to cause a processor to:
    control an optical path difference to generate an interference pattern of a source light, as an interferometer that stares downwards at a surface comprising a source light, traverses the source light;
    record amplitudes of the interference pattern of the source light at successive rows of a focal plane array as the interferometer traverses the source light, wherein the focal plane array has a fixed frame rate selected such that each in-track row of the focal plane array corresponds to a different point along the interferogram for the source light.

16. The non-transitory computer readable medium of claim 15, further including instructions to cause the processor to:

vary the optical path difference based on a relative velocity of the interferometer to the source light.

17. The non-transitory computer readable medium of claim 15, further including instructions to cause the processor to:

synchronize a rate of change of the optical path difference with a relative velocity of the interferometer to vary the optical path difference over a predetermined range as the interferometer traverses the source light.

18. The non-transitory computer readable medium of claim 15, further including instructions to cause the processor to:

output the recorded amplitudes from the focal plane array at a fixed rate.

19. The non-transitory computer readable medium of claim 18, further including instructions to cause the processor to:

re-sample the interferogram associated with amplitudes of respective portions of the interferogram; and extract a spectrum of the source light from the resampled interferogram with a Fourier transform algorithm.

20. The non-transitory computer readable medium of claim 15, wherein:

the instructions cause the processor to record amplitudes of interference patterns of multiple adjacent source lights at successive rows of respective columns of the focal plane array as the interferometer traverses the source lights and as the optical path difference of the interferometer is varied by an optical path difference controller, and output amplitudes of the columns of the focal plane array as interferograms of the respective source lights; and the multiple adjacent source lights correspond to a swath of a terrestrial surface.

\* \* \* \* \*